United States Patent [19]
Fukae et al.

[11] Patent Number: 5,419,125
[45] Date of Patent: May 30, 1995

[54] EXHAUST-GAS RECOMBUSTION SYSTEM

[75] Inventors: Yasuo Fukae; Tsukasa Minato, both of Tokyo, Japan

[73] Assignee: Calsonic Corporation, Tokyo, Japan

[21] Appl. No.: 124,200

[22] Filed: Sep. 21, 1993

[30] Foreign Application Priority Data

Sep. 21, 1992 [JP] Japan .............................. 4-65651 U
Sep. 21, 1992 [JP] Japan .............................. 4-65652 U

[51] Int. Cl.6 .............................................. F01N 3/20
[52] U.S. Cl. ........................................ 60/289; 60/293; 60/305; 60/306
[58] Field of Search ................. 60/302, 304, 305, 306, 60/293, 307, 289

[56] References Cited

U.S. PATENT DOCUMENTS

| | | | |
|---|---|---|---|
| 3,247,666 | 4/1966 | Behrens | 60/305 |
| 3,654,763 | 4/1972 | Ito | 60/305 |
| 3,869,859 | 3/1975 | Thornburgh | 60/305 |
| 4,133,175 | 1/1979 | Katoh | 60/306 |
| 4,149,378 | 4/1979 | Nakamura | 60/305 |
| 4,154,058 | 5/1979 | Mase | 60/299 |
| 4,224,792 | 9/1980 | Hayashi | 60/305 |

FOREIGN PATENT DOCUMENTS

59-34012 3/1984 Japan .
59-141118 9/1984 Japan .
3-134241 6/1991 Japan .

Primary Examiner—Ira S. Lazarus
Assistant Examiner—Daniel J. O'Connor
Attorney, Agent, or Firm—Foley & Lardner

[57] ABSTRACT

An exhaust-gas recombustion system for recombusting exhaust gases coming out of exhaust ports of an internal combustion engine equipped with a catalytic converter, comprises a plurality of branch pipes of an exhaust manifold connected to the exhaust ports, a plurality of secondary air injection tubes each connected to either one of the branch pipes for recombusting the exhaust gases coming out of the exhaust ports by secondary air injection. An air-injection nozzle of the secondary air injection tube is directed towards the exhaust port communicating with the connected branch pipe along the axial line of the exhaust port. Additionally, the air-injection nozzle is arranged close to a curved wall of the connected branch pipe to effectively sweep away resultant exhaust gases left in the exhaust port and consequently to assure a rapid activation of the catalytic converter during a cold start of the engine.

12 Claims, 10 Drawing Sheets

EXHAUST-GAS RECOMBUSTION SYSTEM

BACKGROUND OF THE INVENTION

1. Field of the Invention

The present invention relates to an exhaust-gas recombustion system which is arranged in the exhaust line of an internal combustion engine, and specifically to a system which can promote activation of a catalytic converter by recombusting exhaust gases at the aid of secondary air pumped to exhaust manifolds or cylinder-head exhaust ports.

2. Description of the Prior Art

Recently, there have been proposed and developed various exhaust-gas recombustion systems which utilize secondary air to promote chemical reactions that reduce exhaust-gas pollutants. The exhaust-gas recombustion system usually cooperates with a catalytic converter disposed in the exhaust line of the engine to promote a chemical reaction between a catalyst and the pollutants. As is generally known, a catalytic converter is provided in an exhaust system of the engine for converting harmful exhaust gases such as unburned hydrocarbons (HC), carbon monoxide (CO) to harmless gases such as harmless water vapor and carbon dioxide ($CO_2$). However, during a cold start of the engine in cold weather, it is difficult to obtain a sufficient activation of the catalytic converter, since a temperature of the catalyst support arranged in the catalytic converter cannot rise quickly to a temperature enough to provide adequate catalytic action, owing to cold engine. During a cold start, an insufficient activation of the catalytic converter results in high exhaust emissions. Thus, it is advantageous quickly to warm the catalyst support in the catalytic converter to a desired temperature in order to assure a rapid activation of the catalytic converter. For this reason, an exhaust-gas recombustion system employing a secondary air injection device is generally provided in the exhaust system of the engine to burn any HC and CO in the exhaust gases coming out of the exhaust ports by additional oxygen in the secondary air. Such exhaust-gas recombustion systems using a secondary air injection device have been disclosed in Japanese Patent First Publication (Tokkai Heisei) No. 3-134241 and in Japanese Utility Model First Publication (Jikkai Showa) No. 59-141118.

Figure 1:
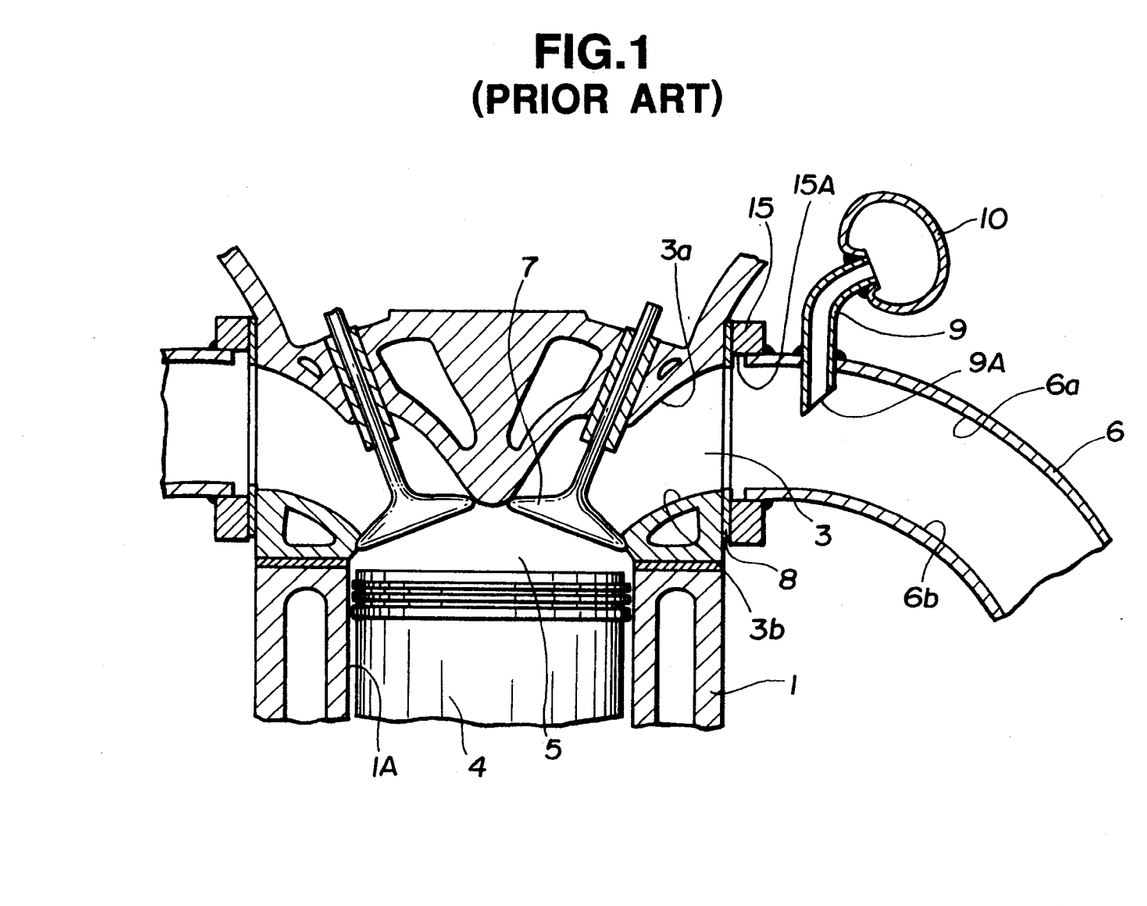
FIG. 1 is a cross-sectional view illustrating a conventional exhaust-gas recombustion system with a secondary air injection device.

FIG. 1 shows a conventional exhaust-gas recombustion system with a secondary air injection device as described in the above Japanese document No. 3-134241. In FIG. 1, a piston 4 is reciprocatingly disposed in a cylinder 1A defined in a cylinder block 1 of an internal combustion engine. A combustion chamber 5 is defined on the top of the piston 4. An exhaust valve 7 is arranged between the combustion chamber 5 and an exhaust port 3 and opened to allow burned gases to exhaust from the cylinder 1A to an exhaust manifold 6 during the exhaust stroke. The exhaust manifold 6 is fitted through a gasket 8 to an engine cylinder head 2 to interconnect the exhaust ports 3 and the exhaust pipe (not shown). As seen in FIG. 1, the exhaust port 3 is curvedly arranged between the combustion chamber 5 and the inlet port of the exhaust manifold 6, while the exhaust manifold 6 is curvedly arranged between the exhaust ports 3 and the exhaust pipe. In order to assure a smooth exhaust-gas flow, the axial line of the curved exhaust ports 3 and the axial line of the curved exhaust manifold 6 are continuously connected to each other, such that the outside curved wall 3a of the exhaust port 3 and the outside curved wall 6a of the exhaust manifold 6 are formed continuously and that the inside curved wall 3b of the exhaust port 3 and the inside curved wall 6b of the exhaust manifold 6 are formed continuously. As clearly seen in FIG. 1, a secondary air injection tube 9 is attached to the exhaust manifold 6 in such a manner as to penetrate the outside curved wall 6a of the exhaust manifold 6. The air-injection tube 9 is bended so that the air-injection nozzle 9A of the air-injection tube 9 is arranged perpendicularly to the axial line of the curved exhaust manifold 6 or the exhaust-gas flow. The air-injection tube 9 is projected from an air manifold 10 into which the secondary air is pumped and introduced. With the above arrangement, the previously noted prior art exhaust-gas recombustion system suffers from the drawback that a smooth introduction of the secondary air is disturbed owing to residual exhaust gases left in the exhaust ports 3 close to the exhaust valve 7. In this case, an insufficient amount of the secondary air comes into contact with high-temperature and high-pressure exhaust gases in the exhaust manifold 6 having a relatively low temperature as compared with the engine block. This causes an insufficient recombustion of the exhaust gases coming out of the combustion chamber 5. Specifically during a cold start of the engine, the exhaust-gas temperature cannot rise to a desired temperature enough for a rapid activation of the catalytic converter which is provided downstream of the exhaust manifold 6, owing to such insufficient recombustion. In addition to the above, the above-mentioned prior art exhaust-gas recombustion system as well as the catalytic converter cannot sufficiently recombust unburned HC and CO content in the exhaust gas, during a cold start.

Figure 2:
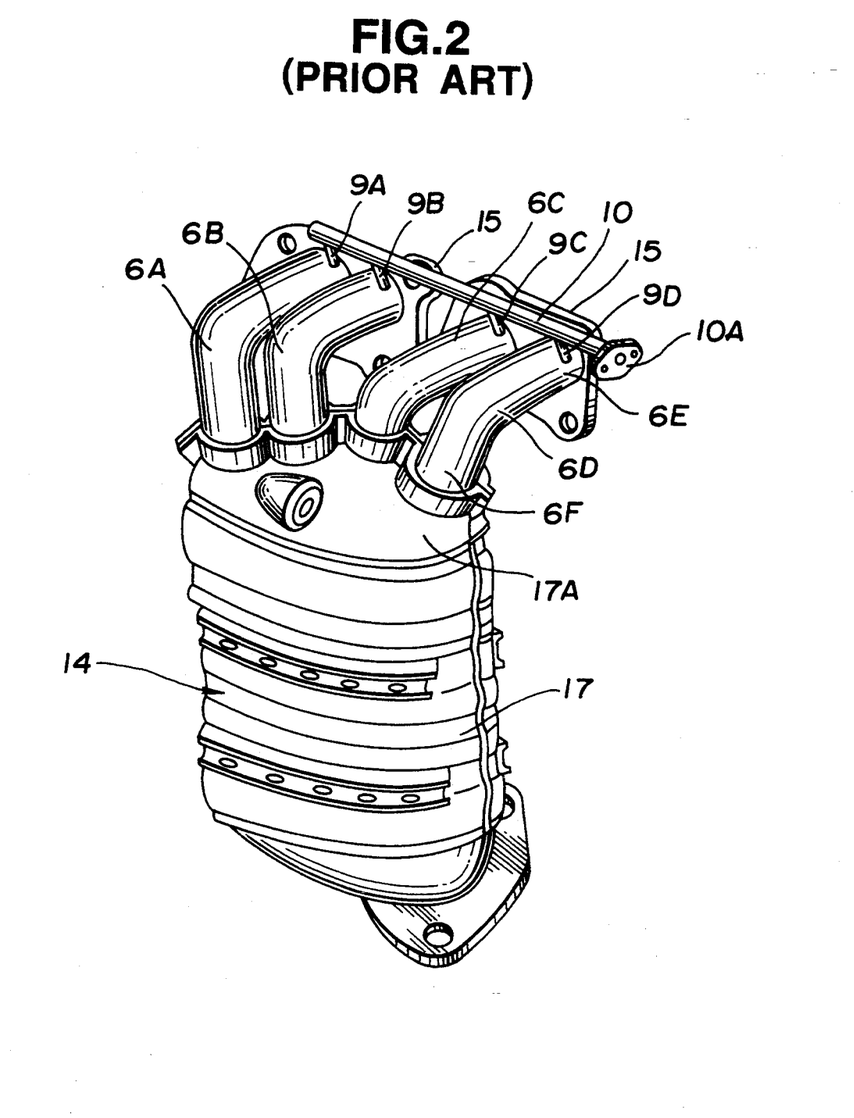
FIG. 2 is a schematic perspective view illustrating a conventional exhaust-gas recombustion system incorporating a manifold type catalytic converter and an secondary air injection device.
Figure 3:
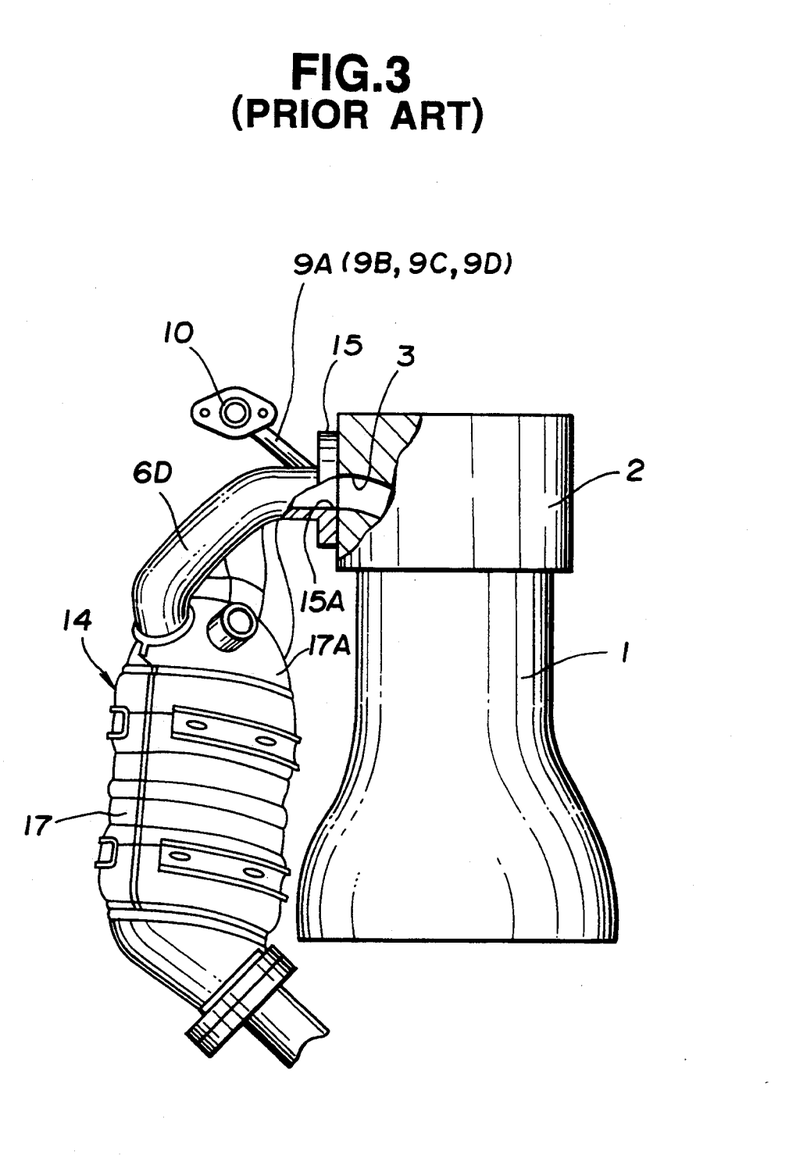
FIG. 3 is a side view illustrating the conventional exhaust-gas recombustion system shown in FIG. 2.

Referring now to FIGS. 2 and 3, there is shown one example of a mounting arrangement of the air-injection tubes 9A, 9B, 9C and 9D on branch pipes 6A, 6B, 6C and 6D of the exhaust manifold 6 in cars equipped with a manifold type catalytic converter 14. One such manifold type catalytic converter has been disclosed in Japanese Utility Model First Publication (Jikkai Showa) No. 59-34012. The aforementioned air-injection tube as generally referred to is represented by reference numeral "9" as illustrated in FIG. 1. As seen in FIG. 3, the manifold type catalytic converter 14 is attached to one side of the cylinder head 2. The manifold type catalytic converter 14 comprises a plurality of flanges 15 provided for firmly mounting the catalytic converter assembly on the cylinder head 2, four branch pipes 6A, 6B, 6C and 6D, and a converter shell 17. The converter shell 17 is oval in cross-section and accommodates the catalyst support therein. In brief, the manifold type catalytic converter 14 is a compact exhaust-emission control device obtained by assembling the catalytic converter and the exhaust manifold as a unit. It is advantageous that the manifold type catalytic converter 14 is arranged in the vicinity of the exhaust ports upstream of the exhaust system and that the catalytic converter 14 is capable of treating high-temperature and high-pressure exhaust gases just coming out of the exhaust ports with a high catalytic conversion efficiency. The flanges 15 include through openings 15A each of which communicates with either one of the exhaust ports 3. As clearly seen in FIG. 1, one end 6E of each branch pipe 6A, 6B, 6C and 6D is connected into either one of the through openings 15A by welding. As seen in FIG. 2, the respective ends 6E of the branch pipes are arranged in parallel with each other. The other ends 6F of the branch pipes 6A, 6B, 6C and 6D are connected to a substantially dome-shaped upper end 17A of the catalytic converter. The secondary air manifold 10 is connected through a flange 10A to a compressed air source (not shown). The air manifold 10 is traditionally made of a cylindrical hollow pipe. The upstream ends of the air-injection tubes 9A, 9B, 9C and 9D are respectively connected to the air manifold 10, while the downstream ends of the air-injection tubes are respectively connected to the ends 6E of the branch pipes 6A, 6B, 6C and 6D such that the air-injection nozzle is projected into the corresponding pipe end 6E. As seen in FIG. 2, the respective air-injection tubes 9A, 9B, 9C and 9D are arranged in parallel with each other. In the previously noted construction of the air-injection device, the secondary air is distributed from the compressed-air source through the air manifold 10 to the respective air-injection tubes 9 and consequently to the respective branch pipes 6. The distributed secondary air promotes chemical reactions that reduce exhaust-gas pollutants by recombusting unburned HC and CO in the exhaust ports 3 and each of the branch pipes 6A, 6B, 6C and 6D. Thus, the manifold type catalytic converter 14 is rapidly activated owing to the quickly warmed catalyst support. However, in the above-mentioned air-injection tube arrangement, a secondary air distribution between the four air-injection tubes 9A, 9B, 9C and 9D is uneven, since the flow rate of the secondary air flowing through the air-injection tube arranged upstream of the air manifold 10 is greater than that through the air-injection tube arranged downstream of the air-manifold 10. The secondary air distribution ratio is gradually decreased from the air-injection tube 9D through the air-injection tube 9C and the air-injection tube 9B to the air-injection tube 9A in that order. Therefore, it is difficult to provide a uniform recombustion in the respective ports 3 and the branch pipes 6A, 6B, 6C and 6D. Owing to the unequal recombustion, the prior art exhaust-gas recombustion system cannot assure a sufficient oxidation treatment of the exhaust gases by means of the secondary air injection. The previously described Japanese Utility Model First Publication No. 59-141118 discloses a secondary air supply system optimally applicable for four-cylinder in-line engines in which one end of a single secondary air injection tube is connected to the exhaust manifold at the confluent point of the plural branch pipes. The Japanese document teaches the recombustion of the exhaust gases at the downstream ends of the respective branch pipes of the exhaust manifold. The above conventional secondary air supply system also cannot provide a sufficient recombustion of the exhaust gases because the exhaust-gas temperature at the downstream end of the branch pipe is lower than that at the upstream end of the branch pipe and in addition the secondary air is merely introduced into the confluent point of the downstream ends of the branch pipes. In addition to the above, the previously noted conventional exhaust-gas recombustion system with a manifold type catalytic converter teaches a separate arrangement of branch pipes of an exhaust manifold. Since the adjacent branch pipes are arranged independently of each other, the total surface area of the respective branch pipes 6A, 6B, 6C, and 6D is relatively great. This promotes heat radiation from each of the branch pipes 6. Consequently, the exhaust-gas temperature tends to be easily lowered, due to the above independent arrangement of the branch pipes. Thus, the temperature-rise of the catalyst support in the manifold type catalytic converter is delayed during a cold start of the engine. As a result, a catalytic conversion efficiency is necessarily lowered.

SUMMARY OF THE INVENTION

It is, therefore in view of the above disadvantages an object of the present invention to provide an improved exhaust-gas recombustion system which is capable of assuring a rapid activation of a catalytic converter even during a cold start of an internal combustion engine in cold weather and capable of suppressing exhaust emissions to a minimum.

It is another object of the invention to smoothly sweep away resultant exhaust gases in the exhaust ports while effectively injecting secondary air into the exhaust ports and branch pipes of an exhaust manifold and to insure a satisfactory recombustion of the exhaust gases by secondary air injection.

It is a further object of the invention to provide an exhaust-gas recombustion system which is capable of assuring an uniform recombustion of exhaust gases in exhaust ports and branch pipes of the exhaust manifold.

It is a still further object of the invention to provide an exhaust-gas recombustion system equipped with a manifold type catalytic converter which is capable of effectively suppressing heat-radiation from branch pipes of the exhaust manifold.

In order to accomplish the aforementioned and other objects of the invention, an exhaust-gas recombustion system for recombusting exhaust gases coming out of exhaust ports of an internal combustion engine equipped with a catalytic converter, comprises a plurality of branch pipes of an exhaust manifold connected to the exhaust ports, a plurality of secondary air injection tubes each connected to either one of said branch pipes, for recombusting the exhaust gases coming out of the exhaust ports by secondary air injection, characterized in that an air-injection nozzle of said secondary air injection tube is directed toward the exhaust port communicating with the connected branch pipe along the axial line of the exhaust port and that said air-injection nozzle is arranged close to a curved wall of the connected branch pipe to effectively sweep away resultant exhaust gases left in the exhaust port. The air-injection nozzle may be arranged close to an outside curved wall of the connected branch pipe. An air manifold to which said secondary air injection tubes are connected may comprise a secondary air reservoir and in addition the air manifold includes means for connecting upstream ends of said secondary air injection tubes to said air manifold such that a pressure level of the secondary air is identical at the respective upstream ends of said secondary air injection tubes. The air reservoir may comprise an upper flange through which said reservoir is connected to an air supply tube of a compressed air source, an essentially cylindrical hollow section in which compressed air is temporarily stored, and a bottom end closing one opening end of said cylindrical hollow section in an air-tight fashion, and in addition the connecting means includes a peripheral wall of said cylindrical hollow section of said air reservoir to which the upstream ends of said secondary air injection tubes are connected so that the upstream ends are equi-distantly arranged in the circumferential direction of said cylindrical hollow section and radially arranged on an identical plane of said cylindrical hollow section. Alternatively, the air reservoir may comprise an upper flange through which said reservoir is connected to an air supply tube of a compressed air source, an essentially cylindrical hollow section in which compressed air is temporarily stored, and a bottom end closing one opening end of said cylindrical hollow section in an air-tight fashion, and additionally the connecting means includes a flat surface of said bottom end of said air reservoir to which the upstream ends of said secondary air injection tubes are connected so as to provide an identical pressure level of the secondary air at the respective upstream ends of said secondary air injection tubes.

According to another aspect of the invention, an exhaust-gas recombustion system for recombusting exhaust gases coming out of exhaust ports of an internal combustion engine equipped with a manifold type catalytic converter, comprises a plurality of branch pipes of an exhaust manifold connected to the exhaust ports, a plurality of secondary air injection tubes each connected to either one of said branch pipes, for recombusting the exhaust gases coming out of the exhaust ports by secondary air injection, characterized in that an air-injection nozzle of said secondary air injection tube is directed toward the exhaust port communicating with the connected branch pipe along the axial line of the exhaust port and that said air-injection nozzle is arranged close to a curved wall of the connected branch pipe to effectively sweep away resultant exhaust gases left in the exhaust port, and that said branch pipe is formed in such a manner as to surround at least two adjacent exhaust ports of the engine at the upstream end thereof and to converge to one exhaust passageway at the downstream end thereof, so as to reduce the total surface area of said branch pipes. An air manifold to which said secondary air injection tubes are connected comprises a secondary air reservoir and in addition the air manifold includes means for connecting upstream ends of said secondary air injection tubes to said air manifold such that a pressure level of the secondary air is identical at the respective upstream ends of said secondary air injection tubes, whereby a catalyst support accommodated in a converter shell of said catalytic converter is quickly warmed to a temperature enough for a rapid activation of said catalytic converter during a cold start of the engine.

According to a further aspect of the invention, an exhaust emission control system for an internal combustion engine, comprises a manifold type catalytic converter including an exhaust manifold consisting of a plurality of branch pipes and a converter shell accommodating catalyst support therein, a plurality of secondary air injection tubes each connected to either one of said branch pipes, for recombusting exhaust gases coming out of exhaust ports of the engine by secondary air injection, and an air manifold to which said secondary air injection tubes are connected comprises a secondary air reservoir and means for connecting upstream ends of said secondary air injection tubes to said air manifold such that a distribution ratio of the secondary air is uniform at the respective upstream ends of said secondary air injection tubes, wherein said branch pipe is formed in such a manner as to surround at least two adjacent exhaust ports of the engine at the upstream end thereof and to converge to one exhaust passageway at the downstream end thereof, so as to reduce the total surface area of said branch pipes. The branch pipe may be formed of a double-headed branch pipe which is connected to two adjacent exhaust ports of the engine at its upstream end and is converged to one exhaust passageway at its downstream end.

DESCRIPTION OF THE PREFERRED EMBODIMENTS

Figure 4:
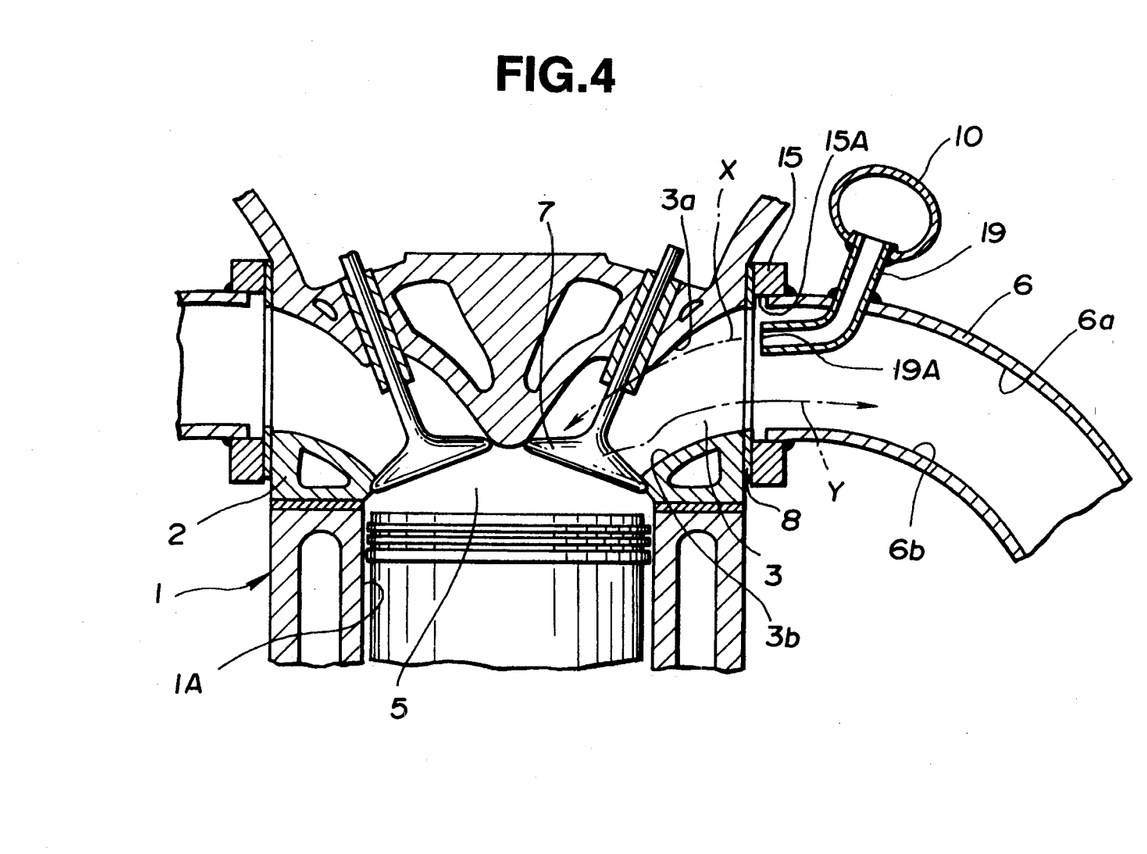
FIG. 4 is a cross-sectional view illustrating an exhaust-gas recombustion system with a secondary air injection device according to the invention.

Referring now to the drawings, particularly to FIG. 4 there is shown a cross-sectional view of the cylinder head portion of an internal combustion engine. The basic construction of the exhaust-gas recombustion system of the embodiment as shown in FIG. 4 is similar to that of the prior art exhaust-gas recombustion system as shown in FIG. 1. Therefore, the same reference numerals used in the conventional system of FIG. 4 will be applied to the corresponding elements used in the embodiment of FIG. 4, for the purpose of comparison between the conventional system and the improved system. The exhaust-gas recombustion system of the embodiment shown in FIG. 4 is different from that of the conventional system shown in FIG. 1 in that the shapes of the air-injection tubes are different from each other and air-injection directions are different from each other A secondary air injection device employed in the exhaust-gas recombustion system of the embodiment includes a curved air-injection tube 19 attached to either one of the branch pipes 6. In more detail, the injection nozzle 19A of the curved air-injection tube 19 is directed toward the exhaust port 3 along the axial line of the exhaust port 3 having the curved exhaust-gas flow path. In addition, the air-injection tube 19 is curved so that the injection nozzle 19A is arranged close to the outside curved wall 6a of the exhaust manifold or the branch pipe 6 to effectively sweep away resultant exhaust gases left in the exhaust port 3. As seen in FIG. 4, it is preferable that the injection nozzle 19A is extended near or into the exhaust port 3.

With the above arrangement, when the exhaust valve 7 has been closed, the secondary air is injected from the nozzle 19A of the air-injection tube 19 into the exhaust port 3 along the outside curved wall 3a as shown by one dotted-line X of FIG. 4. The secondary air flowing along the outside curved wall 3a pushes resultant exhaust gases lying in the vicinity of the exhaust valve 7 into the exhaust manifold 6 along the inside curved walls 3b and 6b as shown by one-dotted line Y of FIG. 4. Therefore, the resultant exhaust gases in the exhaust ports 3 are forcibly swept away and as a result the exhaust ports 3 and the upstream ends of the exhaust manifold 6 are filled with the secondary air. When the exhaust valve 7 is opened at the subsequent exhaust stroke, high-temperature and high-pressure exhaust gases exhausted out of the combustion chamber 5 are effectively recombusted by the filled secondary air. Such good recombustion results in a quick temperature-rise of the catalyst support in the catalytic converter disposed in the exhaust system. Accordingly, the catalytic converter can be rapidly activated even during a cold start of the engine in cold weather. As appreciated from the above, the previously noted improved exhaust-gas recombustion system as well as the catalytic converter contributes to effectively reduce unburned CO and HC content in the exhaust gases by satisfactory secondary air injection.

Figure 5:
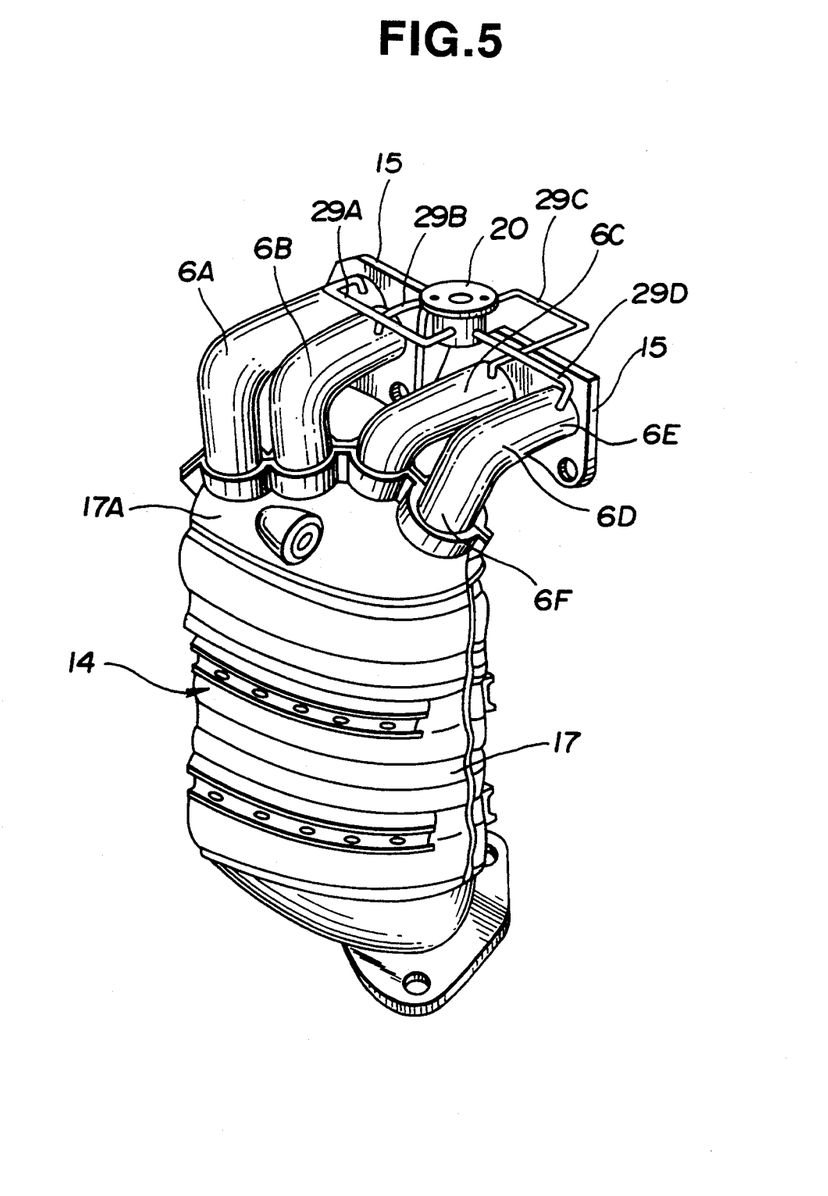
FIG. 5 is a schematic perspective view illustrating a mounting arrangement of a plurality of secondary air injection tubes of a secondary air injection device employed in the exhaust-gas recombustion system according to the invention.
Figure 6:
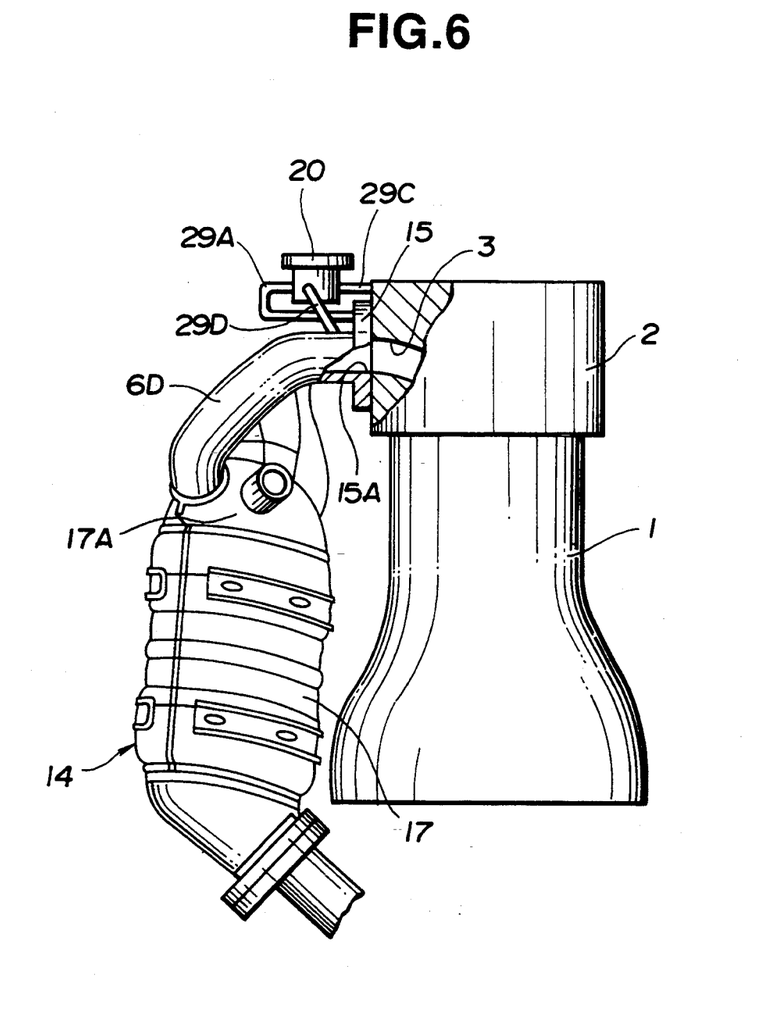
FIG. 6 is a side view illustrating the exhaust-gas recombustion system shown in FIG. 5 and partly sectioned.
Figure 7:
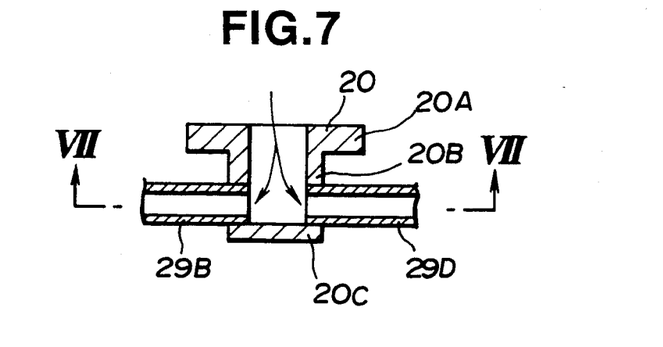
FIG. 7 is a longitudinal cross-sectional view illustrating a secondary air reservoir employed in the secondary air injection device of the exhaust-gas recombustion system shown in FIG. 6.
Figure 8:
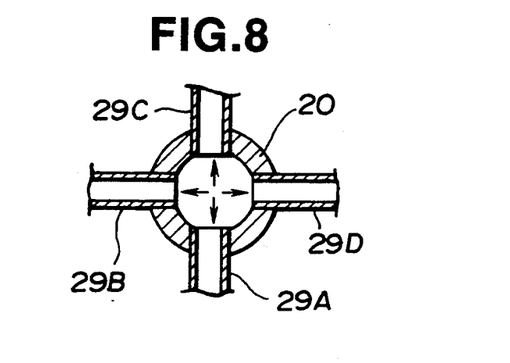
FIG. 8 is a lateral cross-sectional view illustrating the air reservoir shown in FIG. 7.

Referring now to FIGS. 5 through 8, there is shown another embodiment of the exhaust-gas recombustion system. In this embodiment, a four-cycle engine equipped with a manifold type catalytic converter 14 is exemplified. As illustrated in FIGS. 5 and 6, four exhaust ports 3 are defined in the cylinder head 2 mounted on the engine cylinder block 1. The manifold type catalytic converter 14 is attached to one side of the cylinder head 2. The basic construction of the catalytic converter is similar to that of the manifold type catalytic converter shown in FIGS. 2 and 3. The exhaust-gas recombustion system shown in FIGS. 5 and 6 is different from the conventional system shown in FIGS. 2 and 3 in that a plurality of secondary air injection tubes are radially projected from a secondary air tank or reservoir. In the embodiment shown in FIGS. 5 and 6, the secondary air from the compressed air source (not shown) is temporarily stored in the air reservoir 20. As clearly seen in FIG. 7, the air reservoir 20 has an upper flange 20A through which the reservoir 20 is connected to the air supply! tube of the compressed air source, and an essentially cylindrical hollow section 20B in which compressed air is temporarily stored, and a flat bottom end 20C closing one opening end of the cylindrical hollow section 20B in an air-tight fashion. As shown in FIG. 8, the upstream ends of the four air-injection tubes 29A, 29B, 29C and 29D are connected to the peripheral wall of the cylindrical hollow section 20B of the air reservoir 20, in such a manner that the upstream ends of the air-injection tubes 29A through 29D are equi-distantly arranged in the circumferential direction of the cylindrical hollow section 20B and radially arranged on the identical horizontal plane of the cylindrical hollow section 20B. One of the downstream ends of the air-injection tubes 29A through 29D is connected to either one of the upstream ends 6E of the branch pipes 6A, 6B, 6C and 6D so as to divide the secondary air in the air reservoir 20 into the respective branch pipes. With the previously noted radial arrangement of the air-injection tubes 29A, 29B, 29C and 29D, a pressure level of the compressed-air is identical at the respective upstream ends of the air-injection tubes. Thus, the previously noted radial arrangement allows the secondary air to be equally distributed through the air reservoir 20 into the respective branch pipes. The equally distributed secondary air assures uniform recombustion of high-temperature and high-pressure exhaust gases in the respective exhaust ports and the branch pipes 6A, 6B, 6C and 6D. Such uniform recombustion enhances a total efficiency of oxidation treatment of harmful exhaust gases such as CO, HC and the like in the exhaust system in cooperation with the catalytic converter and promotes an activation of the catalytic converter even during a cold start of the engine.

Figure 9:
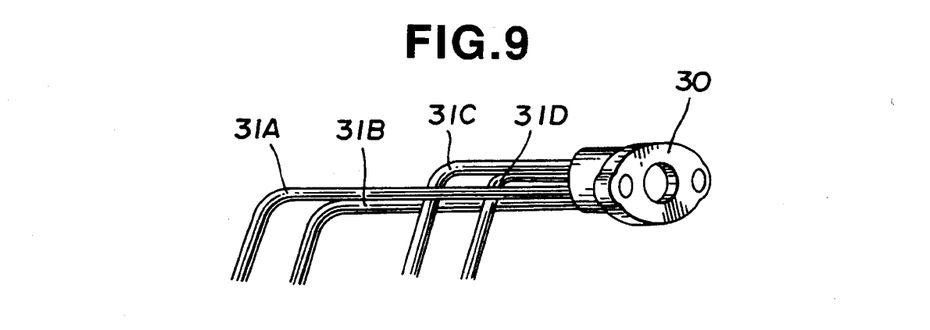
FIG. 9 is a schematic perspective view illustrating a modification of the secondary air injection device shown in FIGS. 5 through 8.
Figure 10:
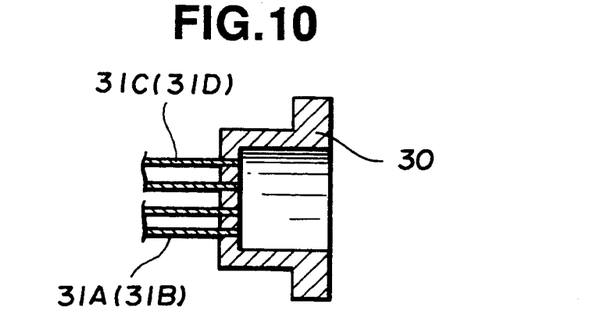
FIG. 10 is an explanatory cross-sectional view illustrating a connection relationship between the air reservoir and the air-injection tubes concerning the modification of the secondary air injection device shown in FIG. 9.

Although the exhaust-gas recombustion system employing the secondary air injection device with the aforementioned radially arranged air-injection tubes is applied for cars equipped with a manifold type catalytic converter, the improved system may be applied for cars equipped with an under-floor type catalytic converter which is arranged beneath the passenger compartment floor through a proper heat shield and insulation pads to protect the compartment floor from heat damage. Alternatively, another air-injection tube arrangement illustrated in FIGS. 9 and 10 may be replaced with the above-mentioned radial arrangement of the air-injection tubes illustrated in FIGS. 5 through 8. In a modification of the air-injection tube arrangement as shown in FIGS. 9 and 10, four air-injection tubes 31A, 31B, 31C and 31D are connected to the bottom end of the secondary air reservoir 30 having the same configuration as the air reservoir 20 shown in FIG. 3. In this case, the respective upstream ends of the air-injection tubes 31A through 31D are subjected to the identical air pressure. Thus, the secondary air distribution ratio between the four air-injection tubes is equivalent. In FIGS. 5 and 6, although the separate branch pipes of the exhaust manifold are utilized, these branch pipes may be replaced with a further improved exhaust manifold having multi-headed branch pipes such as double-headed branch pipes as hereinafter described in detail in FIGS. 11 through 15.

Figure 11:
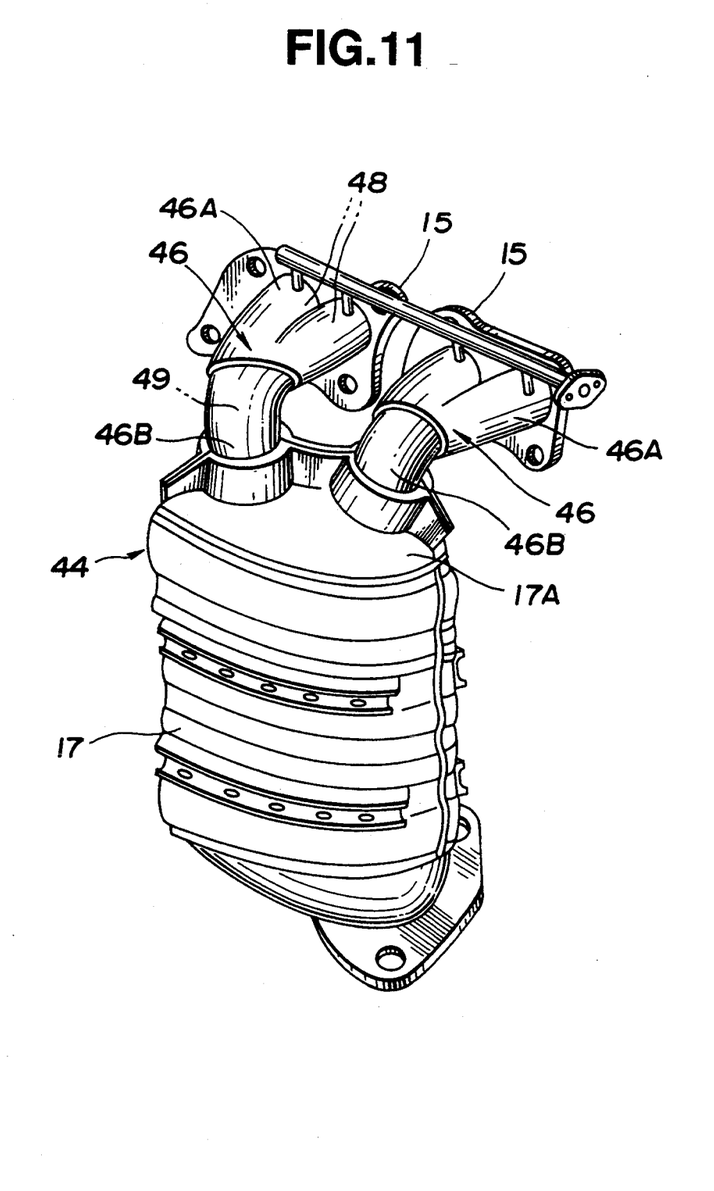
FIG. 11 is a schematic perspective view illustrating an exhaust-gas recombustion system combined with a manifold type catalytic converter having double-headed branch pipes.
Figure 12:
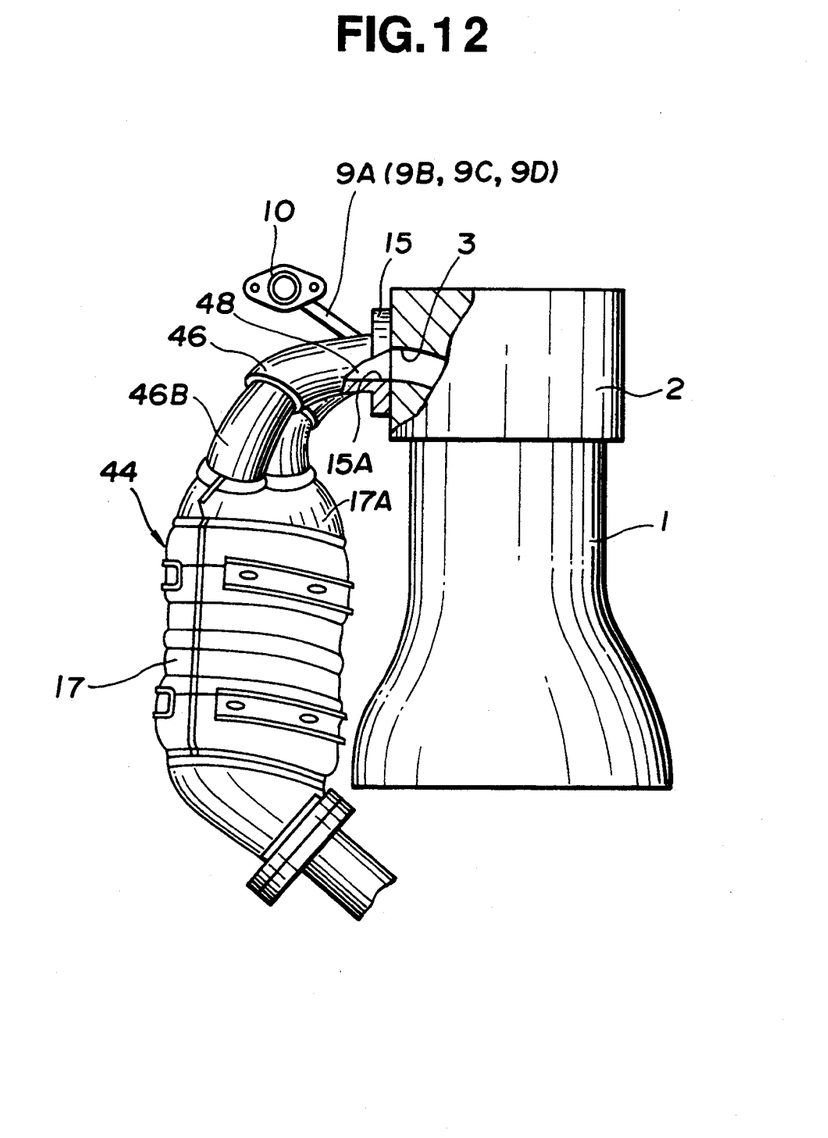
FIG. 12 is a side view illustrating the exhaust-gas recombustion system shown in FIG. 11.
Figure 13:
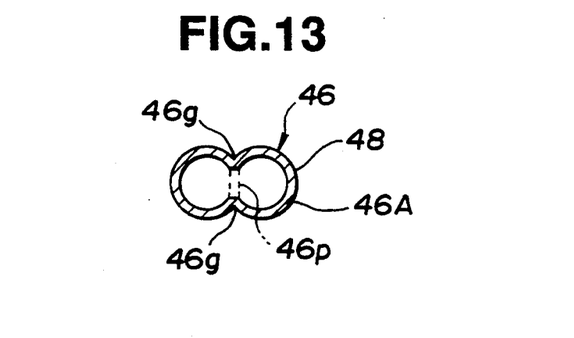
FIG. 13 is a cross-sectional view of the upstream end of the respective branch pipe of the manifold type catalytic converter shown in FIGS. 11 and 12.
Figure 14:
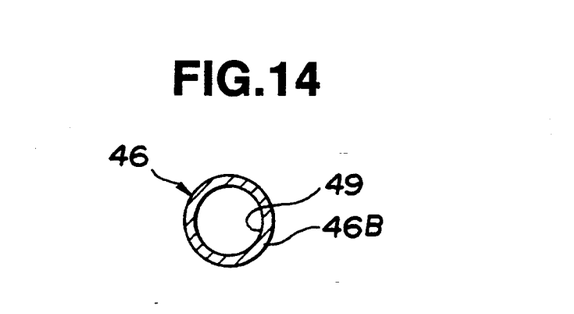
FIG. 14 is a cross-sectional view of the downstream end of the respective branch pipe of the manifold type catalytic converter according to the invention.
Figure 15:
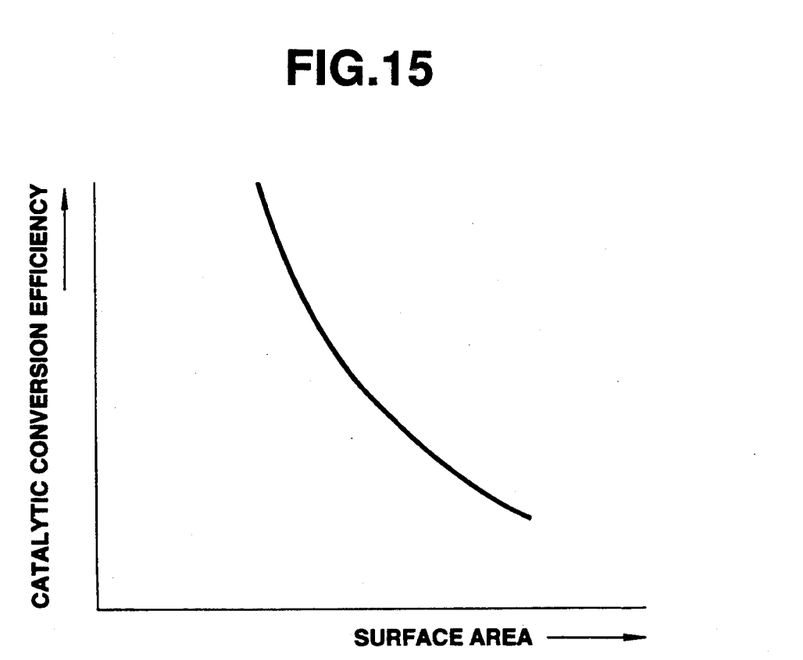
FIG. 15 is a graph illustrating a relationship between the total surface area of branch pipes of the manifold type catalytic converter and a catalytic conversion efficiency.

An improved manifold type catalytic converter having multi-headed branch pipes shown in FIGS.-11 and 12 is superior to a conventional manifold type catalytic converter having single-headed branch pipes to reduce the total surface area of a plurality of branch pipes of the exhaust manifold. As clearly seen in FIGS. 11 and 12, in four-cycle engine, a pair of double-headed branch pipes 46 serving as an exhaust path are connected to the upper end 17A of a manifold type catalytic converter 44. As shown in FIG. 11, one end 46A of the branch pipe 46 is formed as a substantially double-headed pipe having a cross-section illustrated in FIG. 13, while the other end 46B of the branch pipe 46 is formed as a substantially cylindrical pipe having a cross-section illustrated in FIG. 14. The latter cylindrical pipe defines a common exhaust passageway 49 for the two adjacent exhaust ports 3, so that one opening end 48 of the branch pipe 46 surrounds the two adjacent exhaust ports 3 in an air-tight fashion. As appreciated from FIG. 13, since the side wall section 46p of the two adjacent exhaust passageways defined in one end 46A of the double-headed branch pipe 46 can be formed as a common partition wall, the total surface area of the branch pipes is minimized. It is preferable to delete the side wall section 46p so as to assure a higher exhaust-gas flow. In the embodiment, since a single branch pipe is formed such that two adjacent branch pipes each of which is cylindrical in shape are coupled in close proximity to each other as illustrated in FIG. 13, a pair of grooves 46g are formed by coupling the two adjacent branch pipes. The cross-section of the one end 46A may be substantially oval without providing the above grooves 46g. The previously noted multi-headed branch pipe results in reduction in the total surface area of the branch pipes of the manifold type catalytic converter and thus assures a rapid activation of the catalytic converter even during a cold start of the engine and enhance a catalytic conversion efficiency, as appreciated from the test results shown in FIG. 15.

Although in the embodiment shown in FIGS. 11 through 14, a manifold type catalytic converter with multi-headed branch pipes is applied to a four-cylinder engine, such a manifold type catalytic converter may be applied to the other type of an internal combustion engine, such as a three-cylinder engine or a six-cylinder engine.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An exhaust-gas recombustion system for recombusting exhaust gases coming out of exhaust ports of an internal combustion engine, comprising:
   a plurality of branch pipes of an exhaust manifold connected to the exhaust ports; and
   a plurality of secondary air injection tubes each connected to either one of said branch pipes, for recombusting the exhaust gases coming out of the exhaust ports by secondary air injection,
   wherein an air-injection nozzle of said secondary air injection tube is oriented toward the exhaust port communicating with the connected branch pipe substantially along a stream line of the exhaust gases flowing through the exhaust port and said air injection nozzle is arranged close to an outside curved wall of the connected branch pipe and parallel to said outside curved wall in a direction of an axial line of the exhaust port, to effectively sweep away resultant exhaust gases left in the exhaust port.

2. The exhaust-gas recombustion system as set forth in claim 1, wherein an air manifold to which said secondary air injection tubes are connected comprises a secondary air reservoir and said air manifold includes means for connecting upstream ends of said secondary air injection tubes to said air manifold such that a pressure level of a secondary air is identical at the respective upstream ends of said secondary air injection tubes.

3. The exhaust-gas recombustion system as set forth in claim 2, wherein said air reservoir comprises an upper flange through which said reservoir is connected to an air supply tube of a compressed air source, an essentially cylindrical hollow section in which compressed air is temporarily stored, and a bottom end closing one opening end of said cylindrical hollow section in an air-tight fashion, and said connecting means includes a peripheral wall of said cylindrical hollow section of said air reservoir to which the upstream ends of said secondary air injection tubes are connected so that the upstream ends are equi-distantly arranged in the circumferential direction of said cylindrical hollow section and radially arranged on an identical plane of said cylindrical hollow section.

4. The exhaust-gas recombustion system as set forth in claim 2, characterized in that said air reservoir comprises an upper flange through which said reservoir is connected to an air supply tube of a compressed air source, an essentially cylindrical hollow section in which compressed air is temporarily stored, and a bottom end closing one opening end of said cylindrical hollow section in an air-tight fashion, and that said connecting means includes a flat surface of said bottom end of said air reservoir to which the upstream ends of said secondary air injection tubes are connected so as to provide an identical pressure level of the secondary air at the respective upstream ends of said secondary air injection tubes.

5. An exhaust-gas recombustion system for recombusting exhaust gases coming out of exhaust ports of an internal combustion engine equipped with a manifold type catalytic converter, comprising:
   a plurality of branch pipes of an exhaust manifold connected to the exhaust ports;
   a plurality of secondary air injection tubes each connected to either one of said branch pipes, for recombusting the exhaust gases coming out of the exhaust ports by secondary air injection;
   characterized in that an air-injection nozzle of said secondary air injection tube is directed toward the exhaust port communicating with the connected branch pipe along the axial line of the exhaust port and that said air-injection nozzle is arranged close to a curved wall of the connected branch pipe to effectively sweep away resultant exhaust gases left in the exhaust port, and that said branch pipe is formed in such a manner as to surround at least two adjacent exhaust ports of the engine at the upstream end thereof and to converge to one exhaust passageway at the downstream end thereof, so as to reduce the total surface area of said branch pipes.

6. The exhaust-gas recombustion system as set forth in claim 5, characterized in that an air manifold to which said secondary air injection tubes are connected comprises a secondary air reservoir and that said air manifold includes means for connecting upstream ends of said secondary air injection tubes to said air manifold such that a pressure level of the secondary air is identical at the respective upstream ends of said secondary air injection tubes, whereby a catalyst support accommodated in a converter shell of said catalytic converter is quickly warmed to a temperature enough for a rapid activation of said catalytic converter during a cold start of the engine.

7. An exhaust emission control system for an internal combustion engine, comprising:
a manifold type catalytic converter including an exhaust manifold consisting of a plurality of branch pipes and a converter shell accommodating catalyst support therein;
a plurality of secondary air injection tubes each connected to either one of said branch pipes, for recombusting exhaust gases coming out of exhaust ports of the engine by secondary air injection; and
an air manifold to which said secondary air injection tubes are connected comprises a secondary air reservoir and means for connecting upstream ends of said secondary air injection tubes to said air manifold such that a distribution ratio of the secondary air is uniform at the respective upstream ends of said secondary air injection tubes;
wherein said branch pipe is formed in such a manner as to surround at least two adjacent exhaust ports of the engine at the upstream end thereof and to converge to one exhaust passageway at the downstream end thereof, so as to reduce the total surface area of said branch pipes.

8. The exhaust emission control system as set forth in claim 7, wherein said branch pipe is formed of a double-headed branch pipe which is connected to two adjacent exhaust ports of the engine at its upstream end and is converged to one exhaust passageway at its downstream end.

9. The exhaust emission control system as set forth in claim 8, characterized in that said air reservoir comprises an upper flange through which said reservoir is connected to an air supply tube of a compressed air source, an essentially cylindrical hollow section in which compressed air is temporarily stored, and a bottom end closing one opening end of said cylindrical hollow section in an air-tight fashion, and that said connecting means includes a peripheral wall of said cylindrical hollow section of said air reservoir to which the upstream ends of said secondary air injection tubes are connected so that the upstream ends are equi-distantly arranged in the circumferential direction of said cylindrical hollow section and radially arranged on an identical plane of said cylindrical hollow section.

10. An exhaust-gas recombustion system for recombusting exhaust gases coming out of exhaust ports of an internal combustion engine equipped with a catalytic converter, comprising;
a plurality of branch pipes of an exhaust manifold connected to the exhaust to the exhaust ports;
a plurality of secondary air injection tubes each connected to either one of said branch pipes, for recombusting the exhaust gases coming out of the exhaust ports by secondary air injection,
wherein an air-injection nozzle of said secondary air injection tube is oriented toward the exhaust port communicating with the connected branch pipe substantially along a stream line of the exhaust gases flowing through the exhaust port, and said air-injection nozzle is arranged close to an outside curved wall of the connected branch pipe and parallel to said outside curved wall in a direction of an axial line of the exhaust port, to discharge a secondary air injected by said nozzle in a swirl fashion in the vicinity of an exhaust valve located in the exhaust port.

11. The exhaust-gas recombustion system as claimed in claim 10, wherein an air manifold to which said secondary air injection tubes are connected comprises a secondary air reservoir, and said air manifold includes means for connecting upstream ends of said air injection tubes to said air manifold such that a pressure level of the secondary air is identical at the respective upstream ends of said secondary air injection tubes.

12. The exhaust-gas recombustion system as claimed in claim 11, wherein said air reservoir comprises an upper flange through which said reservoir is connected to an air supply tube of a compressed air source, an essentially cylindrical hollow section in which compressed air is temporarily stored, and a bottom end closing one opening end of said cylindrical hollow section in an air-tight fashion, and said connecting means includes a peripheral wall of said cylindrical hollow section of said air reservoir to which the upstream ends of said secondary air injection tubes are connected so that the upstream ends are equidistantly arranged in the circumferential direction of said cylindrical hollow section and radially arranged on an identical plane of said cylindrical hollow section.

* * * * *